United States Patent [19]
Hatakama

[11] Patent Number: 5,774,118
[45] Date of Patent: Jun. 30, 1998

[54] METHOD AND DEVICE FOR DISPLAYING HELP FOR OPERATIONS AND CONCEPTS MATCHING SKILL LEVEL

[75] Inventor: Hiroshi Hatakama, Kawasaki, Japan

[73] Assignee: Fujitsu Limited, Kawasaki, Japan

[21] Appl. No.: 517,684

[22] Filed: Aug. 22, 1995

[30] Foreign Application Priority Data

Dec. 13, 1994 [JP] Japan .................................. 6-308814

[51] Int. Cl.⁶ ....................................................... G06F 3/00
[52] U.S. Cl. ........................................... 345/337; 345/338
[58] Field of Search ...................... 395/326–358, 395/701–709; 434/118; 345/117–120, 146, 902

[56] References Cited

U.S. PATENT DOCUMENTS

| | | | |
|---|---|---|---|
| 4,947,346 | 8/1990 | Kamiya .................................... | 395/337 |
| 4,964,077 | 10/1990 | Eisen et al. .............................. | 395/337 |
| 5,018,082 | 5/1991 | Obata et al. ............................. | 395/337 |
| 5,029,113 | 7/1991 | Miyoshi et al. ......................... | 395/336 |
| 5,115,501 | 5/1992 | Kerr ......................................... | 395/337 |
| 5,122,972 | 6/1992 | Richards et al. ........................ | 395/337 |
| 5,235,679 | 8/1993 | Yoshizawa et al. ..................... | 395/337 |
| 5,377,319 | 12/1994 | Kitahara et al. ......................... | 395/337 |
| 5,388,198 | 2/1995 | Layman et al. .......................... | 395/337 |
| 5,459,488 | 10/1995 | Geiser ...................................... | 395/337 |
| 5,493,658 | 2/1996 | Chiang et al. ...................... 395/336 X |
| 5,513,308 | 4/1996 | Mori ......................................... | 395/337 |
| 5,535,321 | 7/1996 | Massaro et al. ......................... | 395/337 |
| 5,535,323 | 7/1996 | Miller et al. ............................. | 395/338 |
| 5,535,422 | 7/1996 | Chiang et al. ........................... | 395/336 |

FOREIGN PATENT DOCUMENTS

| | | | |
|---|---|---|---|
| 2-096823 | 4/1990 | Japan ................................. | G06F 3/02 |
| 2-228720 | 9/1990 | Japan ................................. | G06F 3/02 |
| 4-326135 | 11/1992 | Japan ................................. | G06F 12/00 |
| 4-326136 | 11/1992 | Japan ................................. | G06F 12/00 |
| 5-027889 | 2/1993 | Japan ................................. | G06F 3/02 |

OTHER PUBLICATIONS

Dictionary of Computers, Information Processing, and Telecommunications, 2nd ed, Rosenberg, pp. 251–252, 434–435, 1987.

Dictionary of Computing, McGraw–Hill, Inc., p. 479, 1993.

*Primary Examiner*—John E. Breene
*Attorney, Agent, or Firm*—Staas & Halsey

[57] ABSTRACT

A method of displaying help information about operations and concepts used in a device includes the steps of storing skill-development information which shows at least one general pattern of skill development for the operations according to a functional classification of the operations, storing help documents which describe the operations and the concepts, and storing an operation log which records use of the operations by a user. The method further includes the steps of comparing the operation log with the skill-development information so as to determine skill levels of the user according to the functional classification of the operations, generating from the help documents the help information which matches with the skill levels of the user, the help information regarding at least one of the operations and the concepts, and displaying the help information.

16 Claims, 13 Drawing Sheets

FIG. 4

```
┌─────────────────────────────────────────────────────────────┐
│ HELP DISPLAY CUSTOMIZATION                                  │
├─────────────────────────────────────────────────────────────┤
│  Customize Help Display ?                                   │
│     [ x ] Yes          [ ] No                               │
│                                                             │
│  Levels of related operations shown on Help                 │
│  Display as priorities ?                                    │
│     Entering Operation                                      │
│        [ ] Entry      [ x ] Intermediate    [ ] Proficient  │
│        Your Level  :  Intermediate                          │
│     Editing Operation                                       │
│        [ ] Entry      [ x ] Intermediate    [ ] Proficient  │
│        Your Level  :  Intermediate                          │
│     Printing Operation                                      │
│        [ x ] Entry    [ ] Intermediate      [ ] Proficient  │
│        Your Level  :  Entry                                 │
│                                                             │
│  Aiding User with experience in                             │
│     [ x ] Word-processor A                                  │
│     [ ] Word-processor B                                    │
│     [ ] Word-processor C                                    │
│                                                             │
│  Showing Recommended Operations ?                           │
│     [ ] Yes           [ x ] No                              │
│                                                             │
│  ( OK )   ( CANCEL )    ( SKILL ESTIMATION )                │
│  ( OUTPUTTING ESTIMATION DATA )                             │
│                                                             │
└─────────────────────────────────────────────────────────────┘
```

FIG. 5

```
<title> CHINESE CHARACTER DICTIONARY </title>
<h1> USE </h1>
<p> Used for displaying Chinese characters that cannot be
displayed by using Conversion Key. </p>
<h1> USAGE </h1>
<p> Type in pronunciation. Then, press Chinese Character
Dictionary Key. </p>
<h1> RELATED OPERATION </h1>
<p skill=low> To display a frequently used word, use <a href=
"#Conversion">Conversion Key</a>. </p>
<p skill=low> To return to Type-In Mode, use <a href="#Cancel">
Cancel Key</a>.</p>
<p skill=mid> It is useful to add a frequently used word to
Dictionary by using <a href="#Addition of Word to Dictionary">
Addition of Word to Dictionary</a> function, if the word cannot be
displayed using Conversion Key. </p>
<p skill=mid> In order to enter <a href="#Control"> Control Code
</a> for defining a character style, etc., access Chinese Character
Dictionary by typing in "Control Code". </p>
<p skill=high> If you want to display a Chinese character but do
not know how to read it, use <a href="#Number of strokes">
Number of Strokes </a>. </p>
<p skill=high> If you want to display a Chinese character but do
not know how to read it, use <a href="#Component"> Component
to search the character through Character Component. </p>
```

```
# Operation Skill
    Entering Operation : Intermediate
    Editing Operation : Intermediate
    Printing Operation : Entry

# Experience in
    Word-processor A

# History of Operations
    0110011111110110110000101011000111101101010 11
    1001110101011100001111010100011101001010111 11
    1100111010111111111111110000100000010000101010
    110110101110011010100010111 1

# Recommended Operations
    1000000000001000000000010000011000000000010000
    0110000000000000000000000000100000000000100000
    0011000101000000000000000100000010111 0000000
    00000000000000000000010000000
```

FIG. 7

```
┌─────────────────────────────────────────────────┐
│            HELP  (Intermediate Level)           │
├─────────────────────────────────────────────────┤
│ Chinese Character Dictionary                    │
│    [ Description of Concept ]                   │
│                                                 │
│   -USE                                          │
│     Used for displaying Chinese characters that cannot be │
│     displayed by using Conversion Key.          │
│                                                 │
│   -USAGE                                        │
│     Type in pronunciation. Then, press Chinese Character │
│     Dictionary Key.                             │
│                                                 │
│   -RELATED OPERATION                            │
│     It is useful to add a frequently used word fo Dictionary by │
│     using Addition of Word to Dictionary function, if the word │
│     cannot be displayed using Conversion Key.   │
│                                                 │
│     In order to enter Control Code for defining a character style, │
│     etc., access Chinese Character Dictionary by typing in │
│     "Control Code".                             │
│                                                 │
│ <RELATED CONCEPT>                               │
│     Japanese Expression Dictionary              │
│     Word File                                   │
│                                                 │
│  ( RETURN )  ( TABLE OF CONTENTS )  ( CUSTOMIZE )│
│                                                 │
└─────────────────────────────────────────────────┘
```

FIG. 8

| HELP (Intermediate Level) |
|---|

Chinese Character Dictionary
 [ Description of Concept ]

-USE
   Used for displaying Chinese characters that cannot be
   displayed by using Conversion Key.

-USAGE
   Type in pronunciation. Then, press Chinese Character
   Dictionary Key.

-RELATED OPERATION
   To display a frequently used word, use Conversion Key.

To return to Type-In Mode, use Cancel Key.

It is useful to add a word frequently used to Dictionary by
   using Addition of Word to Dictionary function, if the word
   cannot be displayed using Conversion Key.

In order to enter Control Code for defining a character style,
   etc., access Chinese Character Dictionary by typing in
   "Control Code".

If you want to display a Chinese character
   but do not know how to read it, use Number of Strokes.

If you want to display a Chinese character
   but do not know how to read it, use Component
   to search the character through Character
   Component.

<RELATED CONCEPT>
   Phrasal Dictionary
   Japanese Expression Dictionary
   Word File (Concept in Word-processor A)
   Non-standard Characters
   Line-drawing Dictionary ( RETURN )   ( TABLE OF CONTENTS )   ( CUSTOMIZE )

FIG. 9

| HELP (Recommended Operation) |
|---|
| You have not used the following operations before.<br>It is advised that you master these operations.<br><br>   <Inverse-conversion><br>      [USE]    Returning to a previous conversion when having pressed Conversion Key an extra time.<br>      [USAGE] Press CTRL Key and Non-Conversion Key at the same time.<br><br>   <End-of-Sentence><br>      [USE]    Moving Cursor to the end of Sentence.<br>      [USAGE] Press CTRL Key and F8 Key at the same time. |

METHOD AND DEVICE FOR DISPLAYING HELP FOR OPERATIONS AND CONCEPTS MATCHING SKILL LEVEL

BACKGROUND OF THE INVENTION

1. Field of the Invention

The present invention generally relates to information processing devices having a processing unit, a memory, an input unit, and a display, and particularly relates to an information processing device which has a function to display online-help information, and to a method of displaying online-help information.

2. Description of the Prior Art

When users use information processing devices such as computers, a large number of the users tend to work on these devices without fully studying operation manuals. This tendency creates a necessity to equip these devices with a function to let the users learn about operations through help information. Thus, in order for the users to be able to learn the operations without spending much time, a method of displaying the help information needs to be improved.

Methods of showing a help display include a context-sensitive help display which shows help information regarding an operation currently being used by a user. For the context-sensitive help display, a method has been proposed which shows a help display commensurate with the user's skills by picking up an appropriate level of the help display from help displays of several different levels. Such methods are disclosed in Japanese Laid-Open Patent Applications No.2-228720 and No.5-27889. Another method which activates and deactivates links of a hyper text according to skill levels has also been proposed, as disclosed in Japanese Laid-Open Patent Application No.4-326136.

However, since users have predilection in types of operations which they normally use, there are differences in knowledge of the operations even among users with similar skill levels. For example, one user may have a thorough knowledge of operations regarding printing a document, but may not know much about operations regarding determining layouts of pages. Another user may know a lot about the layout of pages, but may know little about the printing of documents. That is, when operations are classified according to types of functions, there are differences in skills even among users with similar skill levels. However, the prior-art methods fail to address the importance of estimating skills according to a functional classification, and, thus, cannot display help information matching characteristics of each user. Also, the prior art methods cannot enhance on a display particular help information which should be remembered by the users for their benefit. Furthermore, the prior-art methods cannot display advice information for improving skills of the users without incurring much computation cost.

Also, there is not such a consideration in the prior-art methods as displaying information for letting users recognize their misunderstanding when the users have been making inappropriate guesses or misunderstanding the usage of operations.

Also, a method has been proposed which displays messages based on a decision as to what a user tries to accomplish through his current operation. However, a technique for deciding an objective of the users current operation has yet to be developed.

As described above, the prior-art methods cannot show a help display suitable for user needs according to contexts of operations. Thus, the problem is that the prior-art methods cannot facilitate improvements in user skills. Also, the help display of the prior-art methods put a priority on displaying timely information for users, and fails to address the importance of facilitating increases in the knowledge of operations. Also, creating help displays each for a different skill level is not practical in a sense of program development efficiency.

Data processing devices have permeated into various sectors of industries and households, and a large number of users learn operations of application programs such as word processors by themselves. As a result, there are a number of users who have been using these application programs without knowing convenient functions provided for the programs. Because of an ever decreasing cost of CPU (central processing unit) chips, memory chips, and external memory media, these application programs now can use a larger number of steps, a larger amount of memory, and a larger amount of external memory media.

Accordingly, there is a need in the field of help display for a help-display device and a method which display help information matching with characteristics of each user by checking the development of user skills according to functional classification of operations.

Also, there is a need for a help-display device and a method which facilitate an enhancement of skills by showing users related concepts as to eliminate misunderstandings and inappropriate guesses. Such a method and a device are useful for a method of the context-sensitive type, since users making inappropriate guesses or misunderstandings cannot expect a context-sensitive-type help display to be effective.

Also, there is a need for a help-display device and a method capable of offering advice to users by showing operations which are effective in the enhancement of skills if the users remember said operations.

SUMMARY OF THE INVENTION

Accordingly, it is a general object of the present invention to provide a help-display device and a method which can satisfy the needs described above.

It is another and more specific object of the present invention to provide a help-display device and a method which can display help information matching characteristics of each user by checking the development of user skills according to a functional classification of operations.

In order to achieve the above objects according to the present invention, a method of displaying help information about operations and concepts used in a device includes the steps of storing skill-development information which shows at least one general pattern of skill development for the operations according to a functional classification of the operations, storing help documents which describe the operations and the concepts, and storing an operation log which records use of the operations by a user. The method further includes the steps of comparing the operation log with the skill-development information so as to determine skill levels of the user according to the functional classification of the operations, generating from the help documents the help information which matches the skill levels of the user, the help information regarding at least one of the operations and the concepts, and displaying the help information.

According to the present invention, the device described above uses the skill-development information which shows the general pattern of the skill development according to the functional classification of the operations. Thus, the skill levels of the user are determined according to types of functions of the operations, which leads to a display of the help information matching characteristics of the user.

It is still another object of the present invention to provide a help-display device and a method which facilitate an enhancement of skills by showing users related concepts as to eliminate misunderstandings and inappropriate guesses.

In order to achieve the above objects according to the present invention, the step of generating the help information in the method described above further comprises a step of incorporating into the help information some of the concepts which help the user to understand said at least one of the operations and the concepts.

According to the present invention, the concepts which help the user to understand operations or concepts shown on a help display are also displayed. Thus, the user can check if the operations and concepts shown on the help display correspond to the user's understanding about these operations and concepts.

It is yet another object of the present invention to provide a help-display device and a method capable of offering advice to users by showing operations which are effective in the enhancement of skills if the users remember said operations.

In order to achieve the above objects according to the present invention, the method described above further comprises a step of comparing the operation log with the skill-development information so as to select from the operations at least one unlearned operation which a user of the skill levels should know according to said at least one general pattern of the skill development, and the step of generating the display information further comprises a step of incorporating said at least one unlearned operation into the help information.

According to the present invention, the device selects the unlearned operations, which should be known to the user, by comparing the general pattern of the skill development and the user's operation log. Thus, advice is provided which shows operations effective for enhancing skills if the user remembers the operations.

Other objects and further features of the present invention will be apparent from the following detailed description when read in conjunction with the accompanying drawings.

BRIEF DESCRIPTION OF THE DRAWINGS

FIG. 4 is an illustrative drawing showing an example of a customization display which is used for customizing a help display;

FIG. 5 is an illustrative drawing showing an example of help documents;

FIG. 7 is an illustrative drawing showing an example of a help display;

FIG. 8 is an illustrative drawing showing another example of a help display;

FIG. 9 is an illustrative drawing showing an example of a display of recommended operations;

DESCRIPTION OF THE PREFERRED EMBODIMENTS

In the following, a principle of the present invention will be described first.

Figure 1:
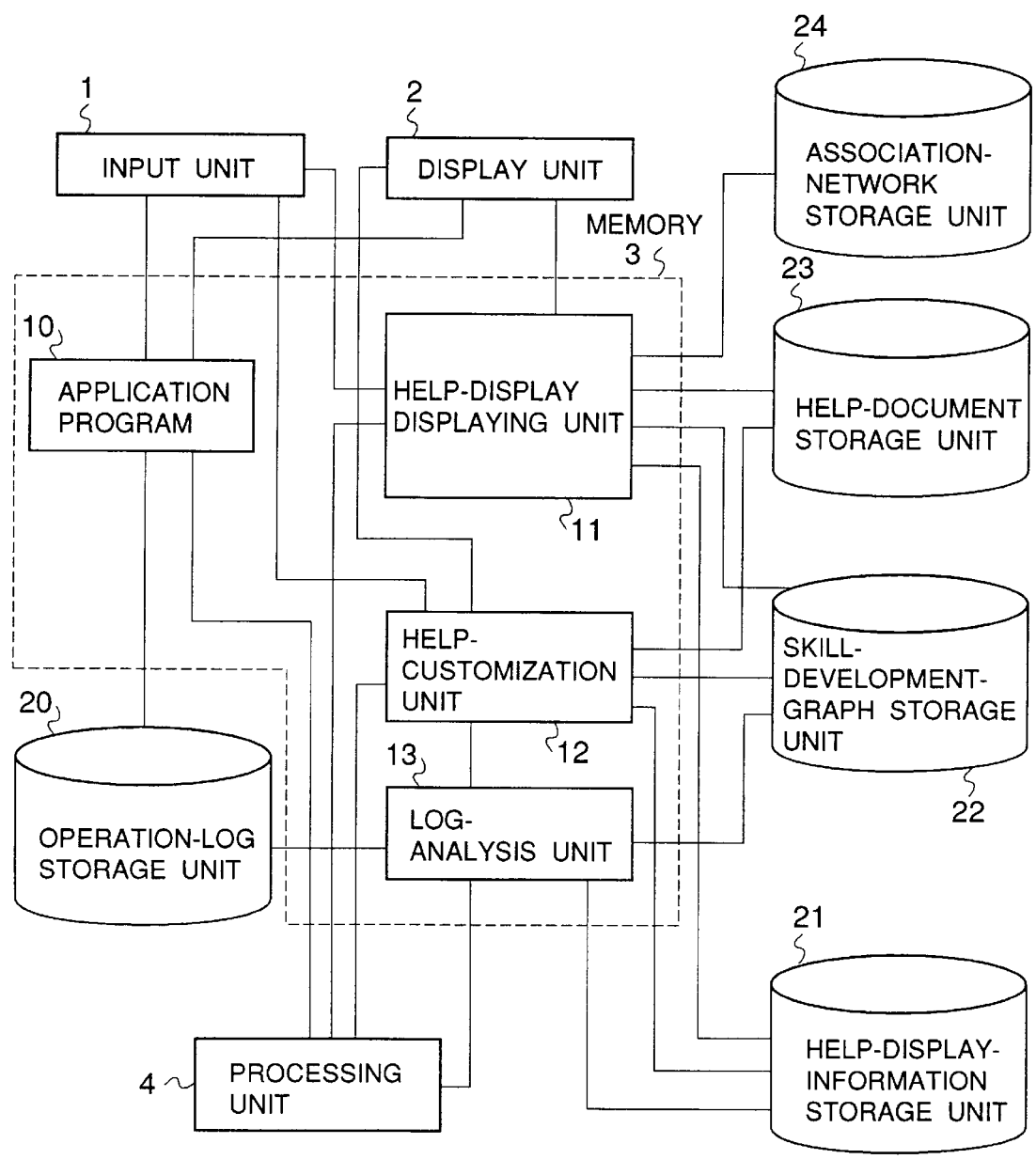
FIG. 1 is a block diagram of the principle of the present invention.

FIG. 1 shows a block diagram of the principle of the present invention. In FIG. 1, a help-display device according to the principle includes an input unit 1 such as a keyboard and/or a mouse, a display unit 2, a memory 3, a processing unit 4, an application program 10, a help-display displaying unit 11, a help-customization unit 12, a log-analysis unit 13, an operation-log storage unit 20, a help-display-information storage unit 21, a skill-development-graph storage unit 22, a help-document storage unit 23, and an association-network storage unit 24.

The application program 10 is used by a user. The application program 10, the help-display displaying unit 11, the help-customization unit 12, and the log-analysis unit 13 are programs stored in the memory 3. These units stored in the memory 3 may be combined to form a single application program.

The processing unit 4 is a unit for controlling the application program 10, the help-display displaying unit 11, the help-customization unit 12, and the log-analysis unit 13. The processing unit 4 may be a CPU (central processing unit) which accesses the memory 3 to execute the programs.

The help-display displaying unit 11 is a module which shows a help display on the display unit 2. Here, the help display for teaching concepts and operations is generated by using help documents and help-display-information created for each user. The help documents are stored in the help-document storage unit 23, and the help-display-information in the help-display-information storage unit 21.

The help-customization unit 12 is a module for customizing the help display through an interaction with a user using the input device 1. That is, the help-customization unit 12 shows a customization display on the display unit 2 in response to a request for the customization from the user. The user using the input device 1 selects conditions shown on the customization display so as to determine what information is to be shown on the help display. The help-customization unit 12 stores the selected conditions in the help-display-information storage unit 21.

One condition which has to be decided on the customization display is the user's skill levels. The help-customization unit 12 receives estimates of the user's skill levels from the log-analysis unit 13, and displays the estimates on the customization display. The user uses the input device 1 to confirm or make a change in the estimates, and thereby determines the skill levels to be used for displaying the help display. Other conditions which have to be decided on the customization display includes whether or not to display recommended operations. Here, the recommended operations are operations which should be mastered by the user.

Another method of customizing the help-display may be to use a setup file written in a predetermined text format. In this case, the help-customization unit 12 reads the setup file when the user requests the customization. In the setup file are written conditions which would otherwise be provided through an interaction with the user.

The log-analysis unit 13 analyzes an operation log of the application program 10 stored in the operation-log storage unit 20, and, if necessary, analyzes files created by the application program 10. Then, the log-analysis unit 13 estimates the user's skill levels based on a skill-development graph stored in the skill-development-graph storage unit 22. Then, the log-analysis unit 13 sends the estimates of the user's skill levels to the help-customization unit 12. As an alternative, the log-analysis unit 13 may store the estimates in the help-display-information storage unit 21, so that the help-customization unit 12 can read the estimates later at a convenient time.

Also, the log-analysis unit 13 may obtain recommended operations based on the skill-development graph. In this case, the log-analysis unit 13 stores the recommended operations in the help-display-information storage unit 21.

The log-analysis unit 13 is activated at a timing indicated by the user. For example, it is activated when the help-customization unit 12 is activated by the user requesting the customization. As an alternative, the log-analysis unit 13 may be automatically activated by some sort of a trigger. For example, the log-analysis unit 13 is activated at a predetermined interval so as to regularly update the information stored in the help-display-information storage unit 21. Also, as an alternative for the configuration, the log-analysis unit 13 may be included in the help-customization unit 12.

The operation-log storage unit 20 stores a operation log regarding operations which the user has used for the application program 10. Here, information on what function is used may be stored by using a bit-map table. As another option, the number of times each operation is used may be stored in a counter. As yet another option, a sequential log on each operation may be stored. The operation log may include not only an operation on a keyboard but also items selected through dialog boxes used in the application program 10. The operation log can be accumulated in the memory 3 during an execution of the application program 10 with access to the operation-log storage unit 20 at an activation or a termination of the application program 10.

The help-display-information storage unit 21 stores information regarding how to display the help information. Such information includes the user's skill levels, the recommended operations, etc.

Figure 2:
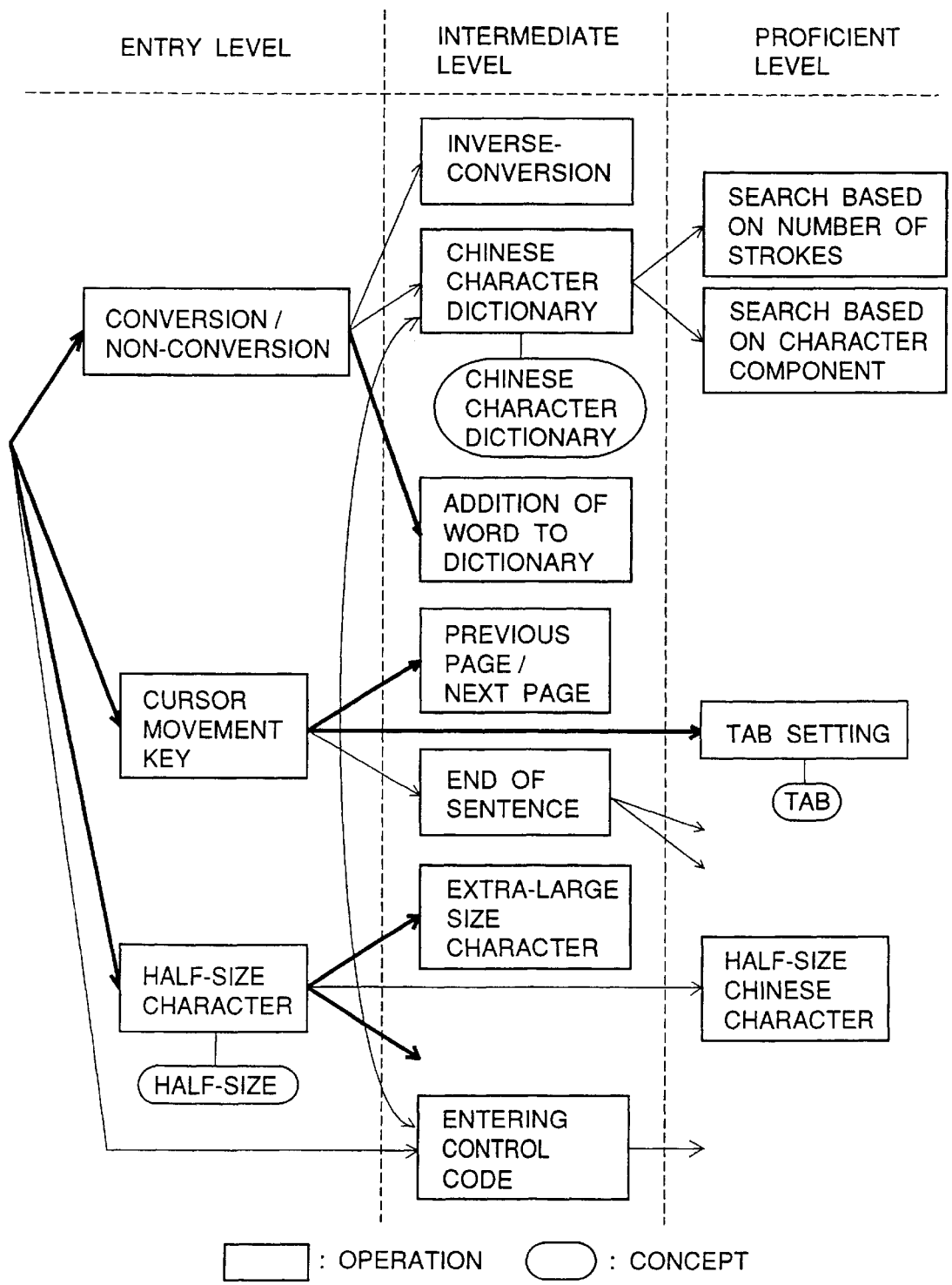
FIG. 2 is an illustrative drawing showing an example of a skill-development graph which represents a general pattern of skill development.

The skill-development-graph storage unit 22 is used for storing the skill-development graph which shows a general pattern of skill development with regard to the operations by the users. Here, the general pattern of skill development is expressed by a directed graph in which nodes corresponding to each operation are connected by arrows. An example of the graph is shown in FIG. 2, which will be described later in detail. Each operation may be provided with information regarding skill levels. In the graph, a process of the skill development is expressed by a tree, and operations which have close relation with each other are connected by special links. Also, each operation is provided with information on whether there is an inherent concept associated with the operation. The skill development may be expressed by a simple tree instead of a graph. Different from the genetic graph used in the intelligent CAI (computer-assisted instruction) for expressing knowledge development, the graph used in the present invention is used only for expressing the relations between the operations, so that associative relations of conceptual knowledge are expressed by the association network stored in the association-network storage unit 24.

The help-document storage unit 23 stores help documents, which are to be shown on the help display, in the hyper text structure or the menu structure. This information includes not only texts but also drawings, images, motion images, voice, etc. In the help-document storage unit 23, the help documents are stored according to skill levels, so that a help document for an appropriate skill level can be shown on the help display.

The association-network storage unit 24 stores the association network which expresses relations between concepts. This association network includes not only the relations of concepts in a sense of the conventional semantic network, but also includes relations of concepts which are likely to be mistakenly associated by users. Each of the concepts may be provided with skill levels.

A plurality of the skill-development graphs and a plurality of the association networks may be provided so as to be able to be replaced by another upon an instruction from the user. These graphs and networks may be included as codes or in such a data format as arrays inside the application program 10. In addition, these graphs and networks may be managed in the same format by using different types of links for these two. The association-network storage unit 24, the help-document storage unit 23, and the skill-development-graph storage unit 22 may be located at a remote site so that the system can be used in personal computer network services and the like.

According to the principle of the present invention, the help display can be customized on the user's request. When the user requests the customization of the help display, the help-customization unit 12 shows the conditions to be selected for the customization. These conditions include the estimates of the user's skill levels, which are generated by the log-analysis unit 13 using the operation log and the skill-development graph. The user selects the conditions, and confirms or makes a change in the skill levels shown on the display unit 2. Then, the help-customization unit 12 stores the selected conditions in the help-display-information storage unit 21. The selection of the conditions can also be made by the help-customization unit 12 reading the setup file.

The help-display displaying unit 11 generates an appropriate help display for the user, and shows it on the display unit 2. Here, the appropriate help display is generated based on the help documents, the help-display information, and the association network. Here, the user's skill levels contained in the help display information are used for selecting a help document corresponding to the user's skill levels. The recommended operations contained in the help display information are shown on the help display, if so requested. Also, the concepts relating to a pertinent operation are extracted from the association network, and are shown on the help display.

Further, data of the analysis of the operation log stored in the operation-log storage unit 20 (e.g., information regarding which functions the user has used) can be disclosed to the user, and so can data of the estimation of the skill levels. That is, the data may be converted into character codes which can be understood by the user, or may be outputted in a predetermined format. An advisor offering services for the application program 10 can use the data in advising the user.

That is, the advisor can obtain the data, can judge the user's experience and skill, and can offer appropriate advice for the user.

In the above description, the help-display displaying unit 11 displays a help document of an appropriate skill level by selecting it from the help documents based on the estimates of the user's skill levels. However, as an alternative, the help-customization unit 12 may modify the help documents stored in the help-document storage unit 23 such that the help-display displaying unit 11 can only access help documents of the estimated skill levels.

In the following, an embodiment of the present invention will be described with reference to accompanying drawings.

First, a process of the customization will be described with reference to FIG. 1.

When the user activates the application program 10, the operation log starts being recorded into the operation-log storage unit 20. When the input unit 1 receives a request for the customization of the help display, the help-customized unit 12 is activated. Then, the help-customization unit 12 activates the log-analysis unit 13 to generate a sub-graph by mapping the operation log into the skill-development graph so as to estimate the user's skill levels. The mapping of the operation log into the skill-development graph and a subsequent estimation of the user's skill levels will be described later in detail.

The estimates of the user's skill levels along with other conditions for the customization are displayed on the display unit 2. The user selects the conditions for the customization, and confirms or makes a change in the estimates. The result of the customization is stored in the help-display-information storage unit 21.

Second, a process of the automatic customization will be described with reference to FIG. 1.

When the user activates the application program 10, the operation log for the user starts being recorded into the operation-log storage unit 20. At a predetermined timing, the log-analysis unit 13 map the operation log into the skill-development graph so as to estimate the user's skill levels. Then, the log-analysis unit 13 stores the estimates of the skill levels in the help-display-information storage unit 21. These estimates stored in the help-display-information are used by the help-customization unit 12 for determining the skill levels used for the customization.

Third, a process of showing the help display will be described with reference to FIG. 1.

The help-display displaying unit 11 generates and displays the appropriate help display on the display unit 2. Here, the generation of the help display is based on the help documents stored in the help-document storage unit 23, the operation skills, the user's experience on similar software products, a history of operations, etc., stored in the help-display-information storage unit 21, and the association network stored in the association-network storage unit 24.

Forth, a process of the active advice will be described with reference to FIG. 1.

On the request for the customization by the user or at a predetermined timing, the log-analysis unit 13 determines the recommended operations based on the skill-development graph. The recommended operations are stored in the help-display-information storage unit 21. The help-display displaying unit 11 reads the recommended operations from the help-display-information storage unit 21, and displays them on the display unit 2. The recommended operations may be those which have never been used before by the user.

Fifth, a process of disclosing the data of the analysis will be described with reference to FIG. 1.

The data of the analysis of the operation log (e.g., information regarding which functions the user has used) or the data of the skill estimation are displayed on the display unit 2 in the character codes understandable to the user. The information displayed on the display unit 2 may be used by the advisor providing supporting services for the user.

FIG. 2 shows an example of the skill-development graph.

In order to help in the understanding of the skill development graph, a typical word-processor for the Japanese language will be briefly explained. In a typical Japanese word-processor, the same keyboard as that of a personal computer for the English language is used. A Japanese word is entered by phonetically spelling the word by using English alphabet keys on the keyboard. By doing so, the data entered through the keyboard can be expressed in Hiragana which is a sort of an alphabet used for representing each sound of the Japanese language. Then, a conversion key on a keyboard (which is provided in addition to the keys of a standard English keyboard or assigned to one of the keys thereof) is pressed in order to convert the Hiragana expression into Chinese characters, which are symbolic characters used for typically expressing the Japanese language in combination with Hiragana. Since a variety of the Chinese characters can be used for expressing the same sound, the conversion key may be pressed several times in order to come up with appropriate Chinese characters for the entered data.

When the entered data is not a word typically used in the Japanese language, the entered data may not be converted into appropriate Chinese characters so that other means of entering words, e.g., entering Chinese characters by using designated codes, may be used. Other means of entering words includes a search of a Chinese character by using the number of strokes constituting the character, using one component of the character as a key for the search, etc. The Hiragana characters and the Chinese characters are displayed on a screen, and each of the characters typically occupies the same space as that of two English letters on the screen. When there is a need to display the characters in a smaller space, "half-size" characters, each of which occupies the same area as that of one English letter, are used.

In FIG. 2, skills of the word-processor operation are classified into an entry level, an intermediate level, and a proficient level, and a general pattern of the skill development is expressed in a graph. In this example, operations for "conversion/non-conversion", "cursor movement key", and "half-size character" belong to the entry level. Operations for "inverse-conversion", "Chinese character dictionary", "addition of word to dictionary", "previous page/next page", "end of sentence", "extra-large-size character", "entering control code" belong to the intermediate level. Also, operations for "search based on character component", "search based on number of strokes", "tab setting", and "half-size Chinese character" belong to the proficient level.

The skill-development graph of FIG. 2 shows that the "conversion/non-conversion" operation in the entry level develops into the "inverse-conversion" operation, the "Chinese character dictionary" operation, and the "addition of word to dictionary" operation. Further, the skill-development graph of FIG. 2 shows that the "Chinese character dictionary" operation develops into the "search based on character component" operation and "search based on number of strokes" operation. Thus, the skill development of the operations are shown in the skill-development graph according to functional classification of the operations.

Also, in FIG. 2, the operation "Chinese character dictionary" is connected with the operation "entering control code" to show a close relationship between these two in terms of developing the skills. The operation "Chinese character dictionary" is provided with the concept of the Chinese character dictionary. Likewise, the operation "half-size character" is provided with the concept of the half-size character, and the operation "tab setting" is provided with the concept of the tab.

As described before, the log-analysis unit 13 of FIG. 1 generates the sub-graph by mapping the operation log into the skill-development graph so as to estimate the user's skill levels. In FIG. 2, thicker lines connecting operations with each other show the sub-graph. This sub-graph, i.e., the thicker lines, shows operations which the user have used before. Information regarding the operations which the user has used before is extracted from the operation log.

Figure 3:
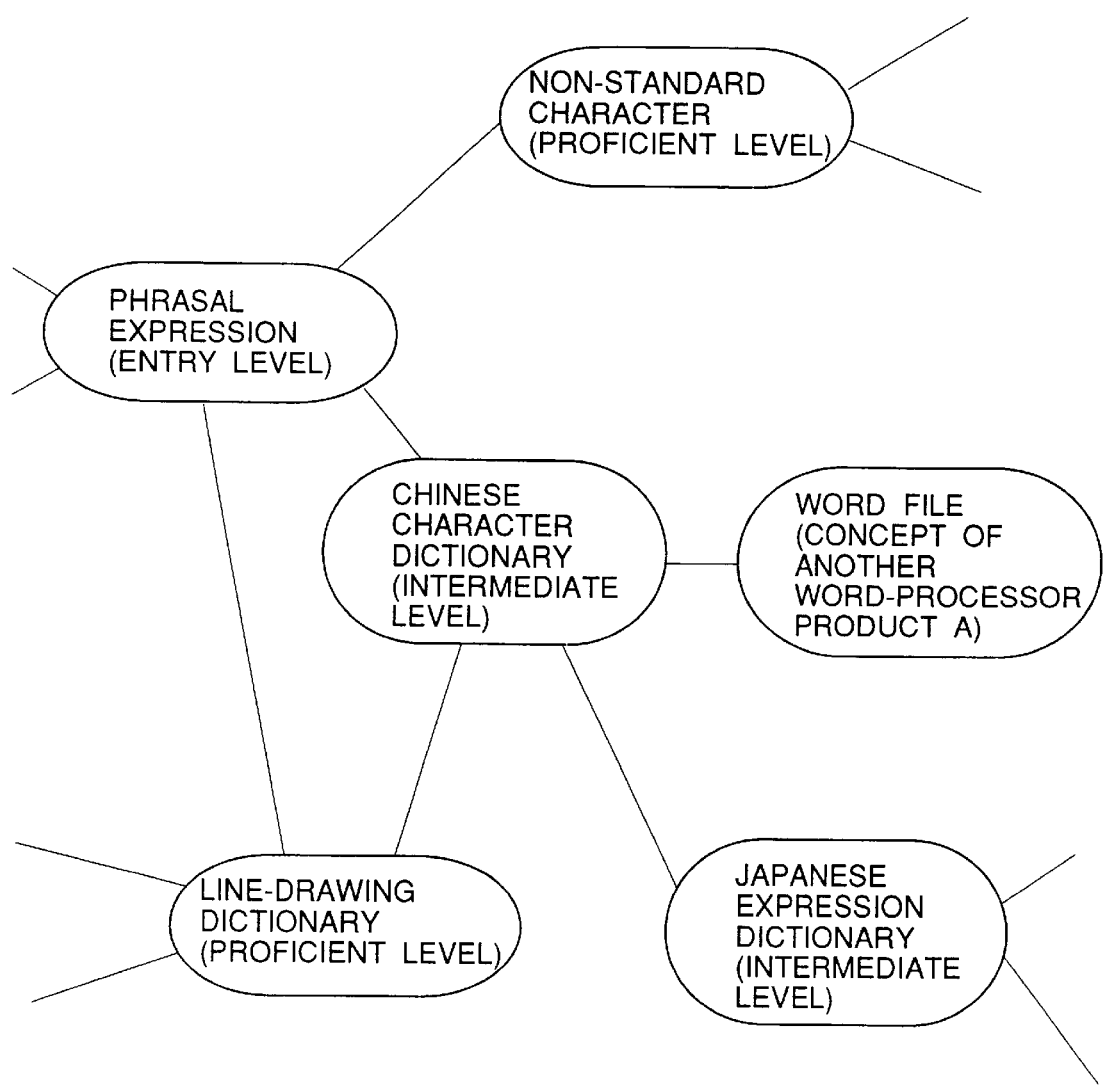
FIG. 3 is an illustrative drawing showing an example of an association network which represents relationships between concepts.

FIG. 3 shows an example of the association network of concepts. This example shows that the Chinese character dictionary (intermediate level) is related to a phrasal expression (entry level), a line-drawing dictionary (proficient level), a non-standard character (proficient level), a word file (concept of another word-processor product A), and a Japanese expression dictionary (intermediate level).

In displaying the help display on the display unit 2 of FIG. 1, the association network of FIG. 3 is used. That is, concepts relating to a relevant operation are extracted from the association network, and are shown on the help display as related matters. This helps the user to realize that the user has been making inappropriate guesses or misunderstandings. As shown in FIG. 3, each of the concepts in the association network is provided with a corresponding skill level such as the intermediate level provided for the concept "Chinese character dictionary". Thus, when extracting the related concepts, those which are commensurate with the user's skill levels can be selected.

Also, a concept which is used in another software product of the same kind and bears similarity to a concept used in the application program 10 may be incorporated into the association network. An example of such concept shown in FIG. 3 is the concept "word file", which is not used in the application program 10 but used in another software product. The concepts of other software products can be shown on the help display to help users who have experiences in the other software products. In this example, the user can learn that the concept "Chinese character dictionary" corresponds to the concept "word file", so that the user can understand the concept "Chinese character dictionary" faster and deeper than he/she would when such analogous concept was not provided.

FIG. 4 shows an example of the customization display used for customizing the help display. As shown in FIG. 4, the conditions for the customization may be determined through an interaction with the user. As a first item in FIG. 4, the user is asked whether to customize the help display. Only when the user selects the customization of the help display, will the help display be customized.

The second item shows skill levels of related operations which will be shown on the help display as priorities. In FIG. 4, the user's skill levels are estimated as the intermediate level for an entering operation, the intermediate level for an editing operation, and the entry level for a printing operation. Namely, the skill levels are estimated according to functional classification of the operations. If the user agrees with these estimates, the user leaves the estimates unchanged. If the user wants more sophisticated editing operations than the user's skill level to be shown on the help display as priorities, for example, the user may check a check box of the proficient level for the editing operation.

The third item is concerned with users having experience with other software products. In FIG. 4, a check box of the word-processor A is checked, meaning that the help display will be displayed in such a manner that users having an experience in the word-processor A are helped by additional information regarding the use of the word-processor A. That is, the concepts of the application program 10 will be shown in comparison with concepts used in the word-processor A.

The fourth item is concerned with the advice function of the help display. In FIG. 4, a check box of "no-analysis" is checked, meaning that the advice function to show the recommended operations will not be used.

In FIG. 4, four buttons, "OK", "cancel", "skill estimation", and "outputting estimation result" are provided. The "skill estimation" button is used for reevaluating the user's skill levels. When the "outputting estimation data" button is clicked, estimation data will be output. The estimation data may include key information which is coded by using dozens of letters and numerals. The user may inform an advisor of this key information over the phone, so that the advisor at a remote site can decode the key information to learn about the user. Thus, the supporting services can be conducted in an efficient manner.

If the customization of the help display is not conducted through the interaction with the user, the log-analysis unit 13 estimates the user's skill levels at a predetermined timing. Then, the help display will be shown in accordance with the estimated skill levels.

FIG. 5 shows an example of the help documents used in the embodiment. A format used in this example is the HTML language used in "www" of the internet, which is augmented by skill attributes for indicating the user's skill levels. In FIG. 5, symbols bracketed in <> represent tags for indicating a logical structure of the help documents. Among these symbols, those which are attached with "/" represent ends of tag indications. <title> is used for representing titles, <h1> is used for representing headings, and <p> is used for representing paragraphs. A character string which is placed between <a> and </a> has a link to the hyper text. In the tag <p> are provided skill attributes, where "low" indicates the entry level, "mid" indicates the intermediate level, and "high" indicates the proficient level.

Figures 6A, 6B:
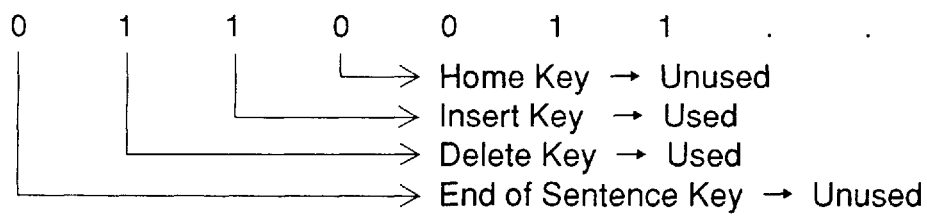
FIG. 6A is an illustrative drawings showing an example of help-display information.
FIG. 6B is an illustrative drawing for explaining a history of operations of FIG. 6A.

FIG. 6A show an example of the help-display-information used in the embodiment. As shown in FIG. 6A, the help-display information includes the skill levels for each of the operations, experiences in similar software products, the history of operations, and the recommended operations.

The history of operations stores information in a bit-map format as to which operations have been used by the user. When the operation log is analyzed, operations which have been used before are marked as bit-on. The recommended operations are stored in the same form as the history of operations.

FIG. 6B shows an example of the history of operations. As shown in FIG. 6B, each bit of the bit stream is designated to a corresponding operation. "On" and "off" of each bit represent the fact that the corresponding operation has been used and not used, respectively. In the example of FIG. 6B, an end of sentence key has not been used, a delete key has been used, an insert key has been used, etc.

In FIG. 6A, the entering operation is selected as the intermediate level, so that the related operations of the intermediate level are displayed as priorities. That is, among relevant operations included in the help documents of FIG. 5, those which belong to <skill=mid> categories will be displayed as priorities.

FIG. 7 and FIG. 8 show examples of the help displays which are generated based on conditions set forth in FIG. 2 to FIG. 6.

The help display of FIG. 7 shows the usage of the Chinese character dictionary. In this help display, the related operations and the related concepts of the intermediate level are shown as priorities. The related operations or the related concepts of the entry level or the proficient level will be displayed by scrolling the help display.

The help display of FIG. 8 shows the usage of the Chinese character dictionary. In this help display, the related operations and the related concepts which do not belong to the intermediate level are shown in smaller characters.

In the embodiment, although the related concepts are extracted from the association network, they can be stored in the help documents. Also, when the related operations are shown on the help display, the related operations which have not been used can be checked in the history of the operations, and can be shown as priorities.

FIG. 9 shows an example of the recommended operations generated based on the analysis of the operations. When the user indicates the analysis to be made for recommending operations in the customization display of FIG. 4, a display of FIG. 9 is shown to the user. The display of FIG. 9 may be shown at a predetermined timing even without an explicit request by the user.

In the example of FIG. 9, the operation "inverse-conversion" and the operation "end of sentence" are regarded based on the analysis as important operations which should be mastered by the user. Thus, functions and usages of these recommended operations are shown on the display. The recommended operations may be determined by selecting operations which have not been used before at a particular level. For example, the mapping of the operation log into the skill-development graph as shown in FIG. 2 reveals that among the operations of the intermediate level, the operation "inverse-conversion" and the operation "end of sentence" have not been used before. Thus, these two operations are selected as the recommended operations in FIG. 9.

Figure 10:
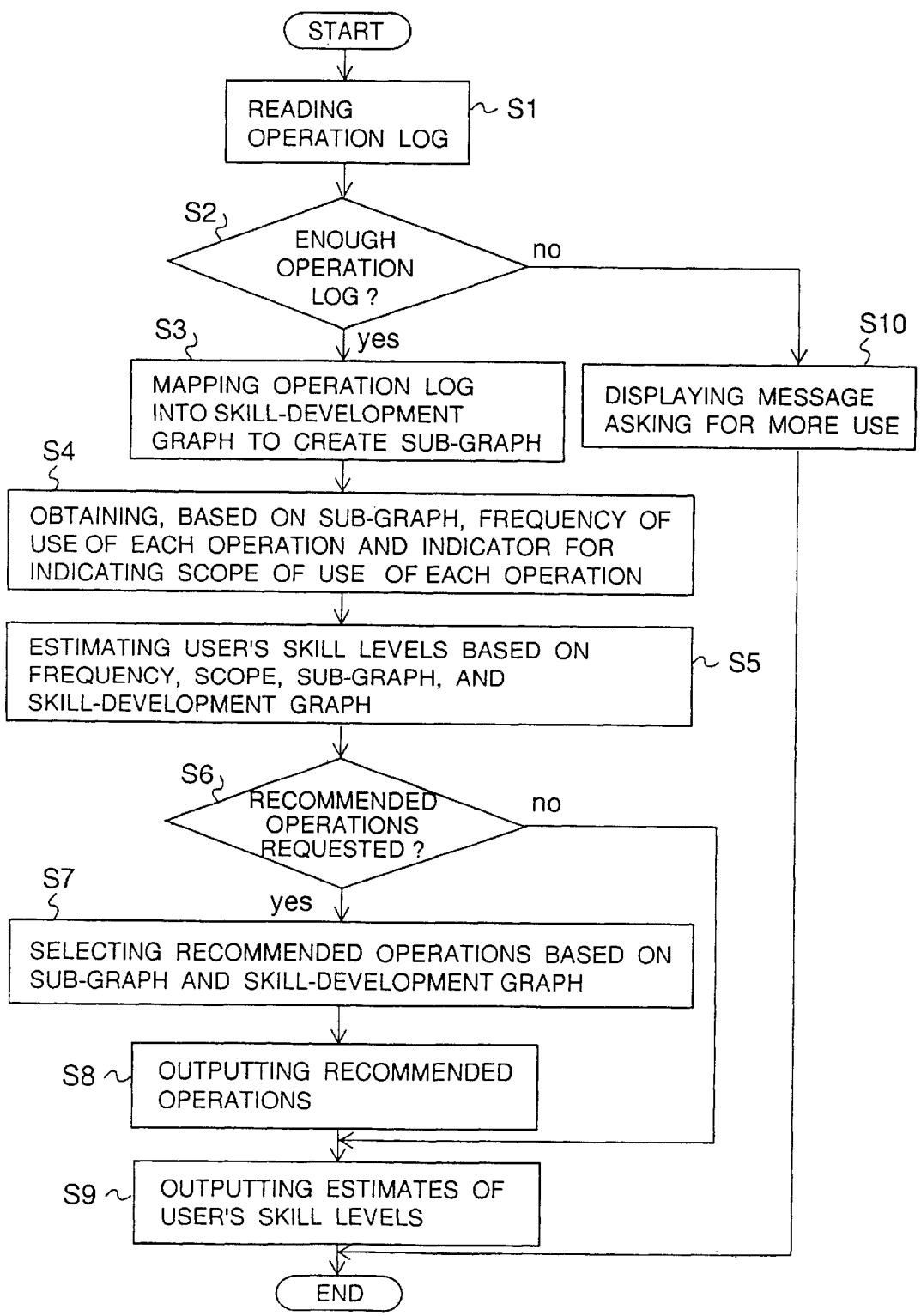
FIG. 10 is a flowchart of a process of a log-analysis unit of FIG. 1.

FIG. 10 shows a process of the log-analysis unit 13 of FIG. 1 according to the embodiment. In the process, the user's skill levels are determined by quantitatively or qualitatively estimating the development of the skills from the entry level to the proficient level after mapping the operation log into the skill-development graph. Also, the analysis of the recommended skills are conducted if it is requested by the user. When the recommended operations are displayed, these recommended operations may be recorded as having been shown to the user, so as not to be shown next time.

In FIG. 10, at a step S1, the operation log is read from the operation-log storage unit 20. If there is a result of a previous analysis, it may be also read. Instead of the operation log itself, the history of the operations which has been extracted from the operation log in advance and is stored in the help-display-information storage unit 21 can also be used. In this example, the case in which the operation log is directly used will be described.

At a step S2, a check is made whether the amount of the operation log is enough for the analysis. If it is enough, the procedure goes to a step S3.

At a step S3, the operation log is mapped into the skill-development graph to generate a sub-graph.

At a step S4, a frequency of the use of each operation is obtained for each skill level based on the sub-graph. Also, an indicator for indicating a scope of the use of each operation is obtained based on the sub-graph.

At a step S5, the user's skill levels are estimated by combining the following methods. First, conditions for classifying the operations are obtained based on the frequency and the scope obtained at the step S4. Second, certain milestones are provided in the graph, and a check is made whether the use of the operations passes the milestones. Third and lastly, the sub-graph obtained for the user is compared with that of a typical user, and similarities and differences are obtained. The classification of the operations based on the use of the operations, the check using the milestones, and the comparison with the typical user can provide various measures for estimating the user's skill levels. Specifics of estimating the skill levels by using these measures are well within the scope of the ordinary skills in the art, and, thus, a description thereof will be omitted.

At a step S6, a check is made whether a request is made for the analysis of the recommended operations. If the request is made, the procedure goes to a step S7. If the request is not made, the procedure goes to a step S9.

At the step S7, the recommended operations which should be mastered by the user are selected by combining the following methods. First, unused operations are traced upstream in the skill-development graph, and an unused operation which is acting as a bottle neck is detected. Second, an unused operation which is connected with a used operation through the special link as being closely related is selected. Third and lastly, operations which constitutes difference between the sub-graph and that of the typical user are selected.

At a step S8, the recommended operations as shown in FIG. 9 are output.

At the step S9, the estimates of the user's skill levels are output. This ends the procedure.

If it turns out at the step S2 that the operation log is not enough for the analysis, the procedure goes to a step S10. At the step S10, a message such as "Please try a skill estimation after using this software a little more" is displayed. This ends the procedure.

Figure 11:
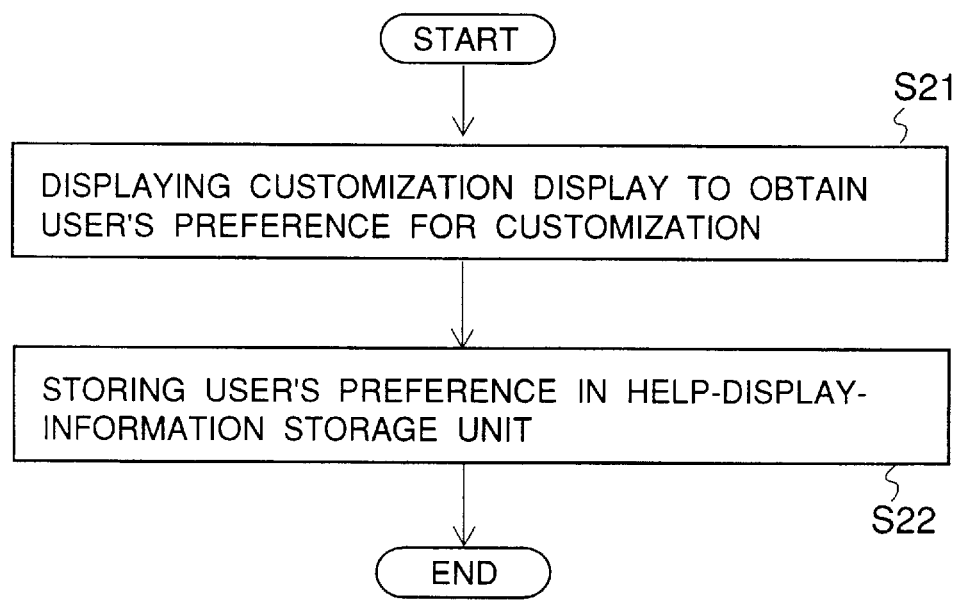
FIG. 11 is a flowchart of a process of a help-customization unit of FIG. 1.

FIG. 11 shows a process of the help-customization unit 12 of FIG. 1 according to the present invention.

At a step S21, the customization display as shown in FIG. 4 is displayed so as to obtain the user's preference for the customization.

At a step S22, the user's preference for the customization is stored in the help-display-information storage unit 21 as shown in FIG. 6. Here, if the user requested the output of the estimation data, the estimation data is converted into the codes and output to the display unit 2.

Figure 12:
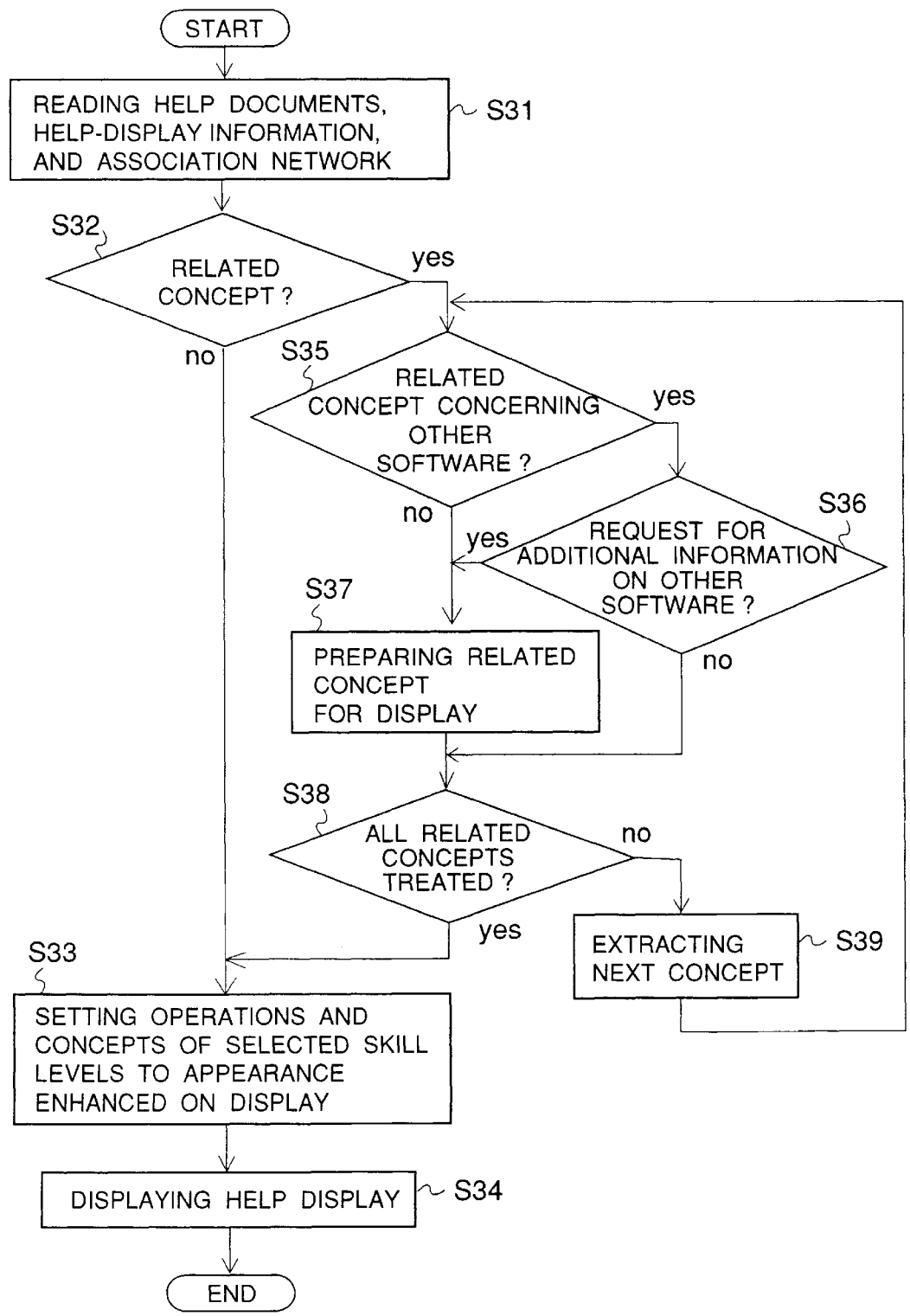
FIG. 12 is a flowchart of a process of a help-display unit of FIG. 1.

FIG. 12 shows a process of the help-display displaying unit 11 of FIG. 1 according to the embodiment.

At a step S31, help documents, help-display information, and the association network are read from the help-document storage unit 23, the help-display-information storage unit 21, and the association-network storage unit 24, respectively.

At a step S32, a check is made whether there is a related concept. If there is, the procedure goes to a step S35. If there is not, the procedure goes to a step S33.

At the step S35, a check is made whether the related concepts are those of other word processors. If these are, the procedure goes to a step S36. If these are not of other word processors, the procedure goes to a step S37.

At the step S36, a check is made whether the user has requested additional information on other word-processor products. If the user has, the procedure goes to a step S37. If the user has not requested, the procedure goes to a step S38.

At the step S37, the related concepts are prepared for the display.

At the step S38, a check is made whether all the related concepts in the association network have finished being treated. If all are treated, the procedure goes to the step S33. If all are not treated, the procedure goes to a step S39, where the next concept is extracted from the association network. Then, the procedure goes back to the step S35 to repeat the same procedure.

At the step S33, the operations and the concepts of the selected skill level are set to an appearance which is to be enhanced on the display. These operations and concepts are included in the help documents and/or in the association network. Here, the selected skill level for each function is found in the help-display information. Also, the operations which have not been used before may be set to an appearance which is to be enhanced on the display. Such unused operations are found in the help-display information. The enhanced appearance is implemented by changing character sizes, colors of characters, or styles of characters.

At a step S34, the help display is displayed. This ends the procedure.

If the operations which should be mastered are already included in the help display, the help-display displaying unit 11 can enhance these operations by changing the appearance.

Figure 13A:
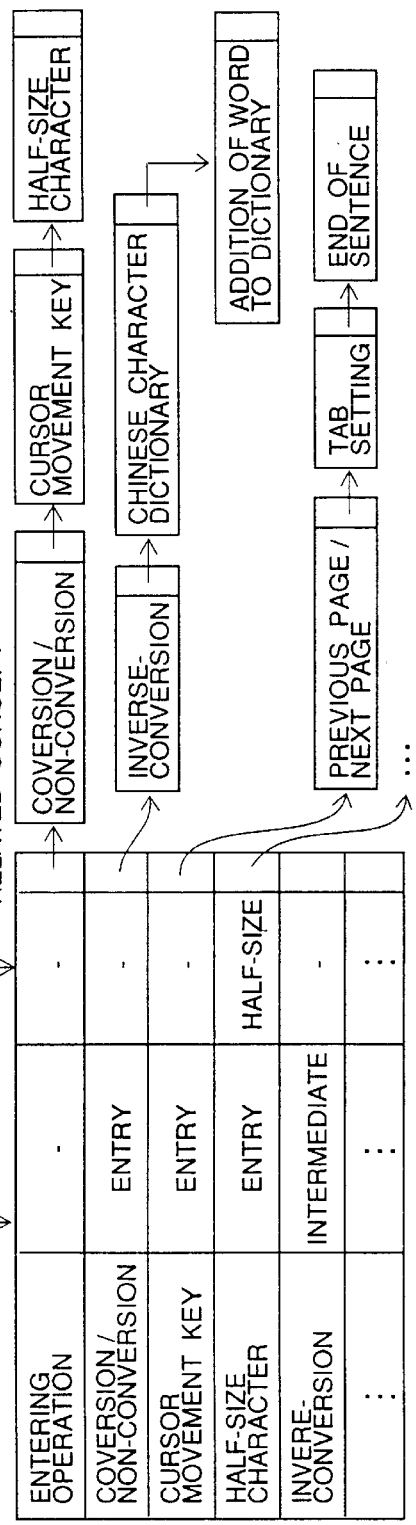
FIGS. 13A and 13B are illustrative drawings for explaining data structures of the skill-development graph and the association network.

FIG. 13A shows a data structure of the skill-development graph according to the embodiment. The skill-development graph such as shown in FIG. 2 can be represented by the data structure shown in FIG. 13A. In FIG. 13A, each operation is provided with a skill level, related concepts, and pointers for indicating operations immediately downstream.

Figure 13B:
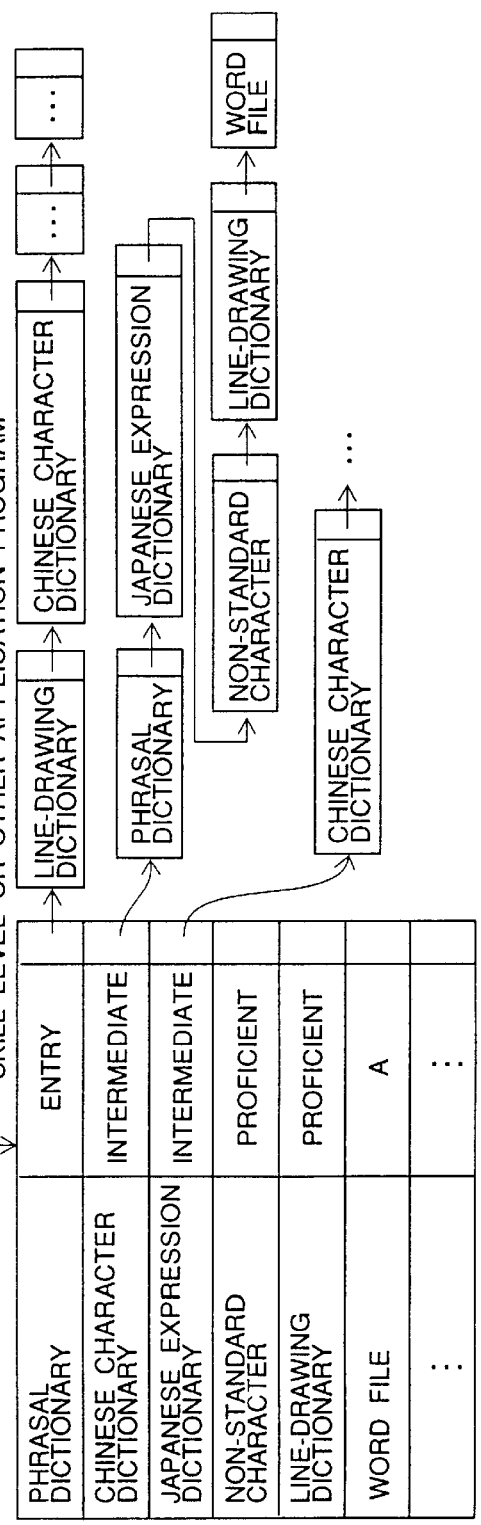

FIG. 13B shows a data structure of the association network. The association network shown in FIG. 3 can be represented by the data structure of FIG. 13B. Each concept is provided with a skill level or an indication that the concept is used in another software product, and with pointers for indicating concepts connected thereto.

In the embodiment, the help-customization unit 12 performs a process for letting the user confirm the skill levels, etc. However, the help-customization unit 12 can be omitted. In this case, the log-analysis unit 13 is used for setting the help-display information, and the estimation of the user skill levels are made at a predetermined timing.

In the embodiment, the log-analysis unit 13 estimates the user's skill levels. Instead, the help-customization unit 12 may receive the user's skill levels determined by the user oneself without using any estimates. Also, although the history of the operations is stored in the help-display-information storage unit, the history of the operation may be extracted from the information stored in the operation-log storage unit 20 as it becomes necessary. Also, although the related concepts are stored in the association-network storage unit 24, the related concepts may be stored in the help documents.

The description of the embodiment has been provided by taking a particular example in which only one skill-development graph and one association network are provided. However, a plurality of the skill-development graphs and the association networks can be generated in advance, so that one of these can be used depending on the skill levels and experiences of the users. Also, in this embodiment, the skill levels are classified into the entry level, the intermediate level, and the proficient level. However, the number of the skill levels may be two or any number more than three.

As described above, according to the present invention, the dynamic customization of the help display allows presenting help information which matches the needs and characteristics of the user. Thus, the help display of the present invention is useful not only for users of the entry level, but also for users of the intermediate or proficient level.

In general, functions cited as "convenient" in an operation manual might not be convenient for users of the entry level. Also, it is not clear if such functions are convenient to a user of a given level.

The help display of the present invention is useful as means for developing skills for the users of the entry level. Also, even the users of the intermediate or proficient level, especially those who have studied on their own, may not know convenient operations. However, such users can learn overlooked operations by using the help display of the present invention, and thereby further develop their skills.

Also, the help display of the present invention is useful for the users who has been using a given software product for a long time but do not know functions introduced in later versions.

Also, the help display can be modified by only adding new information to or modifying the help documents, the skill-development graph, and the association network. That is, there is no need to modify the help display itself. Thus, a development and a maintenance of help functions are relatively easy when compared to those of the prior art. Also, since the skill-development graph is stored as a directed graph, it is easy to add new operations.

Further, the present invention is not limited to these embodiments, but various variations and modifications may be made without departing from the scope of the present invention.

what is claimed is:

1. A method of displaying help information about operations and concepts used in a device, said method comprising the steps of:
   a) storing skill-development information which shows at least one general pattern of skill development for said operations according to a functional classification of said operations;
   b) storing help documents which describe said operations and said concepts;
   c) storing an operation log which records use of said operations by a user;
   d) comparing said operation log with said skill-development information so as to determine skill levels of said user according to said functional classification of said operations;
   e) generating from said help documents said help information which matches said skill levels of said user, said help information regarding at least one of said operations and said concepts; and
   f) displaying said help information.

2. The method as claimed in claim 1, wherein said operations and concepts are used in an application program running on said device.

3. The method as claimed in claim 1, further comprising a step of generating said skill-development information by expressing said skill development by using a directed graph in which each of said operations corresponds to a node connected with at least one of other nodes by at least one directed link.

4. The method as claimed in claim 1, wherein said step e) further comprises a step of incorporating into said help information some of said concepts which help said user to understand said at least one of said operations and said concepts.

5. The method as claimed in claim 1, further comprising a step of g) comparing said operation log with said skill-development information so as to select from said operations at least one unlearned operation which a user of said skill levels should know according to said at least one general pattern of said skill development, and said step e) further comprises a step of incorporating said at least one unlearned operation into said help information.

6. The method as claimed in claim 5, further comprising a step of outputting data regarding details of comparisons made at said step d) and said step g).

7. The method as claimed in claim 4, further comprising the steps of:

storing association-network information in which said concepts are related to each other by using at least one network;

selecting said some of said concepts by using said association-network information.

8. The method as claimed in claim 7, wherein said concepts and said operations are used in an application program running on said device and said some of said concepts further include concepts used in at least one of other application programs.

9. A device for displaying help information about operations and concepts used in said device, said device comprising:

a skill-development-information storage unit storing skill-development information which shows at least one general pattern of skill development for said operations according to a functional classification of said operations;

a help-document storage unit storing help documents which describe said operations and said concepts;

an operation-log storage unit storing an operation log which records use of said operations by a user;

a log-analysis unit comparing said operation log with said skill-development information so as to determine skill levels of said user according to said functional classification of said operations;

a help-display displaying unit generating from said help documents said help information which matches with said skill levels of said user, said help information regarding at least one of said operations and said concepts; and a display unit displaying said help information.

10. The device as claimed in claim 9, wherein said operations and concepts are used in an application program running on said device.

11. The device as claimed in claim 9, wherein said skill-development information comprises a directed graph in which each of said operations corresponds to a node connected with at least one of other nodes by at least one directed link.

12. The device as claimed in claim 9, wherein said help-display displaying unit further comprises means for incorporating into said help information some of said concepts which help said user to understand said at least one of said operations and said concepts.

13. The device as claimed in claim 9, wherein said log-analysis unit further comprises means for comparing said operation log with said skill-development information so as to select from said operations at least one unlearned operation which a user of said skill levels should know according to said at least one general pattern of said skill development, and said help-display displaying unit further comprises means for incorporating said at least one unlearned operation into said help information.

14. The device as claimed in claim 9, further comprising means for outputting data regarding details of comparisons made by said log-analysis unit with regard to a determination of said skill levels and selection of said at least one unlearned operation.

15. The device as claimed in claim 12, further comprising an association-network storage unit storing association-network information in which said concepts are related with each other by using at least one network, wherein said help-display displaying unit further comprises means for selecting said some of said concepts by using said association-network information.

16. The device as claimed in claim 15, wherein said concepts and said operations are used in an application program running on said device and said some of said concepts further includes concepts used in at least one of other application programs.

* * * * *

UNITED STATES PATENT AND TRADEMARK OFFICE
CERTIFICATE OF CORRECTION

PATENT NO. : 5,774,118
DATED : June 30, 1998
INVENTOR(S) : Hiroshi HATAKAMA

It is certified that error appears in the above-identified patent and that said Letters Patent is hereby corrected as shown below:

Col. 7, line 39, change "map" to --maps--.

Signed and Sealed this

Fifth Day of January, 1999

Attest:

*Attesting Officer*

*Acting Commissioner of Patents and Trademarks*